July 30, 1929.   N. S. REED ET AL   1,722,443
MANIFOLD FOR INTERNAL COMBUSTION ENGINES
Filed Jan. 3, 1927
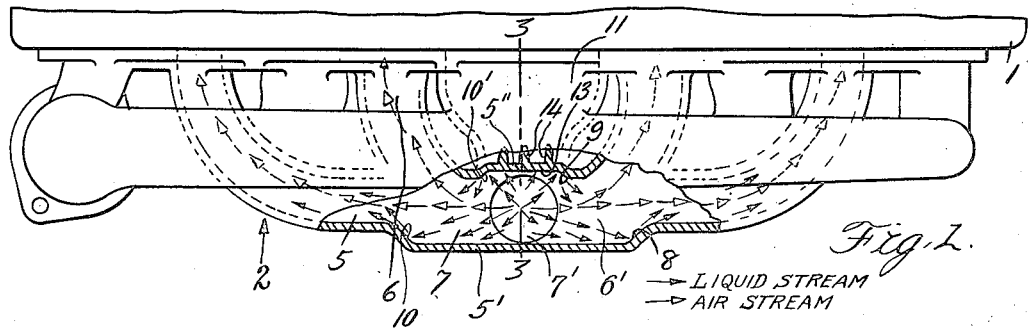
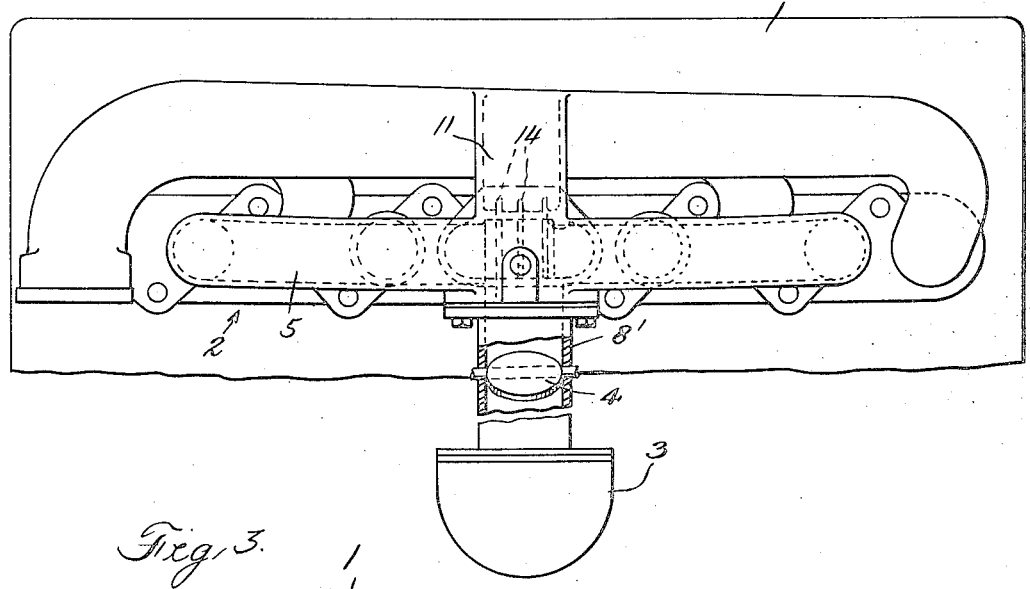
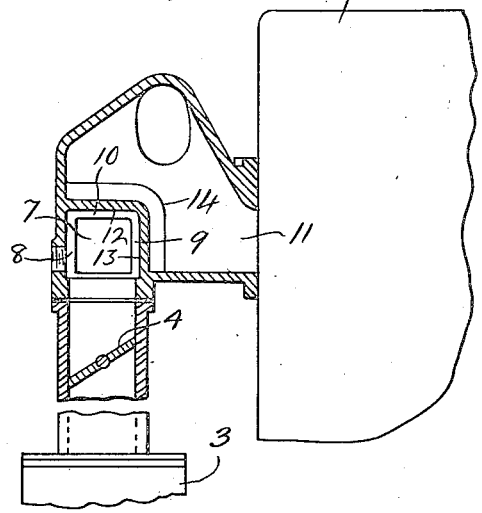
Inventors
Ned S. Reed
Harry G. Sanger
By Whittemore Hulbert
Whittemore & Belknap
Attorneys Patented July 30, 1929.

1,722,443

UNITED STATES PATENT OFFICE.

NED S. REED AND HARRY G. SANGER, OF DETROIT, MICHIGAN.

MANIFOLD FOR INTERNAL-COMBUSTION ENGINES.

Application filed January 3, 1927. Serial No. 158,737.

The invention relates to manifolds for internal combustion engines and has for its main object the provision of an improved manifold construction to effect the proper distribution of the explosive mixture to the various intake ports of a multi-cylinder engine and at the same time avoid choking the passage of explosive mixture to any intake port, thereby providing for the maximum power of the engine. Other objects are to provide an improved construction of intake manifold having an expansion chamber for receiving the air and liquid fuel after it passes the throttle valve of the engine and before it passes to the intake ports of the engine; to provide a heated expansion chamber whereby greater absorption of the heat by the air and liquid fuel is allowed. With these as well as further objects in view the invention resides in the novel features of construction and combinations and arrangements of parts as more fully hereinafter set forth.

In the drawings:—

Figure 1 is a plan view partly in section of a portion of a multi-cylinder internal combustion engine and a manifold construction embodying my invention;

Figure 2 is a side elevation thereof, partly in section;

Figure 3 is a cross section on the line 3—3 of Figure 1.

As shown in the drawings, 1 is a multi-cylinder internal combustion engine, 2 is the manifold construction embodying our invention, and 3 is a carburetor having the usual throttle valve 4 and bolted directly to the manifold.

As shown, the intake manifold 2 has the intake passages 5 and 6 which lead from the intake ports of the engine to a centrally located receiving chamber 7 which receives the air and liquid fuel from the carburetor bolted directly thereto. In this connection it will be noted that the bottom wall 6' of the chamber 7 is centrally provided with an inlet port 7' that registers with the carburetor outlet 8'. To effect the proper commingling and distribution of the liquid fuel and air at the respective points of entering the passages 5 and 6 from the chamber 7, the side walls 5' and 5'' of the central chamber 7 of the intake manifold are offset outwardly as shown whereby shoulders 8, 9, 10, and 10' are provided and serve to deflect the liquid fuel passing over said walls 5' and 5'' into the air streams flowing centrally of the chamber 7 from the carburetor 2 to the passages 5 and 6. In this connection the shoulders 8, 9, 10 and 10' are so positioned and inclined with respect to the passages 5 and 6 that the liquid fuel passing over the walls 5' and 5'' is deflected at the proper points into the centrally flowing air streams as the latter leaves the chamber 7 so that the proper proportion of liquid fuel will be suspended in and commingled with the air as it enters the passages 5 and 6. By having the walls 5' and 5'' offset as shown, the chamber 7 is enlarged so as to constitute an expansion chamber for the liquid fuel and air. Thus, the air and liquid fuel from the carburetor will continue to flow from the carburetor into the chamber 7 under their own inertia after the suction effect from any of the engine cylinders has ceased, thereby enabling a greater quantity of liquid fuel and air to enter the chamber after the suction effect from any of the engine cylinders has ceased. Moreover, this expansion of the air and liquid fuel in the chamber 7 causes the velocity thereof to be reduced so that said air and liquid fuel may be properly heated in the chamber 7 and will be properly commingled at the points of entering the passages 5 and 6.

For heating the liquid fuel and air in the chamber 7, the exhaust manifold has its central exhaust passage 11 so arranged that the exhaust gases passing therethrough are in direct heating contact with the upper and rear walls 12 and 13, respectively, of the expansion chamber 7 to thereby heat the liquid fuel and air within the expansion chamber and particularly to heat the liquid fuel which naturally come into contact with these walls. Also this arrangement makes possible greater heat absorption at low engine speeds and less heat absorption at high engine speeds. For the purpose of increasing in effect the area of the walls 12 and 13 subject to the heat of the exhaust gases, we have formed upon and integral with the upper and lower walls the fins 14 which extend into the exhaust passage 11 and assist in conducting heat to the expansion chamber.

From the above description it will be seen that we have provided a manifold construction which enables a carburetor to be bolted directly thereto, thereby eliminating and obviating entirely the use of a riser or intermediate passage between the carburetor and manifold. Moreover, this manifold construction effects the proper commingling and distribution of the liquid fuel and air. It will also be seen that we have provided an improved construction of intake manifold having an expansion chamber that is so constructed and arranged that the intake passages of the manifold between the expansion chamber and the intake ports of the engine may have the shortest practicable lengths without affecting the passage of the explosive mixture. It will be further seen that the construction of manifold is such that it makes possible greater heat absorption by the liquid fuel and air at low engine speeds and less heat absorption at high engine speeds.

While we have shown a manifold construction which is external to the engine it is apparent that this manifold construction may be formed within either the block or head of the engine or in both.

What we claim as our invention is:

1. A manifold having a central chamber adapted to receive liquid fuel and air from a carburetor, and passages leading from said chamber at opposite ends thereof and constituting means for conducting liquid fuel and air from the chamber to a plurality of cylinders of an internal combustion engine, opposite walls of said chamber having shoulders for deflecting liquid fuel from said walls inwardly toward the longitudinal median line of the chamber so that such deflected fuel will be picked up by and commingled with air as it leaves the chamber and enters the respective passages, the intermediate portions of said walls between said shoulders being offset outwardly and forming an enlargement into which the liquid fuel and air from the carburetor is adapted to flow under their own inertia after the suction effect from any of the engine cylinders has ceased and in which the liquid fuel and air are adapted to expand and cause the velocity thereof to be lowered.

2. A manifold having a chamber through the center of which a stream of air is adapted to flow and over the walls of which liquid fuel is adapted to flow, and a passage leading from said chamber and constituting means for conducting a mixture of liquid fuel and air from said chamber to a plurality of cylinders of an internal combustion engine, one wall of said chamber being provided at a predetermined point with respect to said passage with means for deflecting liquid fuel passing over said wall into the air stream as it enters said passage.

3. A manifold having a chamber through the center of which a stream of air is adapted to flow and over the walls of which liquid fuel is adapted to flow, and a passage leading from said chamber and constituting means for conducting a mixture of liquid fuel and air from said chamber to a plurality of cylinders of an internal combustion engine, one wall of said chamber being provided at a predetermined point with respect to said passage with an outwardly offset shoulder for deflecting liquid fuel passing over said wall into the air stream as it enters said passage, the cross sectional area of said chamber being greater than the cross sectional area of the passage aforesaid.

4. A manifold having a chamber provided at the center of a wall thereof with an opening for receiving liquid fuel and air from a carburetor, and passages leading from said chamber at an end thereof for receiving liquid fuel and air from said chamber and conducting the same to a plurality of cylinders of an internal combustion engine, and means within the chamber at predetermined points with respect to said passages for deflecting liquid fuel from the walls of the chamber inwardly toward the longitudinal median line of the chamber so that such deflected fuel will be picked up and commingled with air at the points of entering the respective passages.

5. A manifold having a central chamber having means at the center of a wall thereof for receiving liquid fuel and air from a carburetor, means for receiving liquid fuel and air from said chamber and conducting the same to a plurality of cylinders of an internal combustion engine including two pairs of relatively short unrestricted passages, one pair leading from opposite ends of said chamber, the other pair projecting laterally from one wall of the chamber adjacent to its opposite ends, and means located at predetermined points of certain walls of said chamber for causing liquid fuel to be deflected from said walls so that it will commingle with air at the points of entering the respective passages.

6. A manifold having a central chamber having means at the center of a wall thereof for receiving liquid fuel and air from a carburetor, means for receiving liquid fuel and air from said chamber and conducting the same to a plurality of cylinders of an internal combustion engine including two pairs of relatively short unrestricted passages, one pair leading from opposite ends of said chamber, the other pair projecting laterally from one wall of the chamber adjacent to its opposite ends, two walls of said chamber having portions thereof offset outwardly with the ends of said offset portions located at predetermined points with respect to said passages and constituting shoulders for deflecting liquid fuel from said walls inwardly toward the longitudinal median line of the chamber so that such deflected fuel will be picked up by and commingled with air as it leaves the chamber and enters the respective pairs of passages aforesaid.

7. A manifold having a central chamber having means at the center of a wall thereof for receiving liquid fuel and air from a carburetor, means for receiving liquid fuel and air from said chamber and conducting the same to a plurality of cylinders of an internal combustion engine including two pairs of relatively short unrestricted passages, one pair leading from opposite ends of said chamber, the other pair projecting laterally from one wall of the chamber adjacent to its opposite ends, a wall of said chamber having portions thereof offset outwardly with the ends of said offset portions located at predetermined points with respect to the last mentioned pair of laterally projecting passages and constituting shoulders for deflecting liquid fuel from the said wall inwardly toward the longitudinal median line of the chamber so that such deflected fuel will be picked up by and commingled with air as it leaves the chamber and enters the first mentioned pair of passages.

8. A manifold having a central chamber having means at the center of a wall thereof for receiving liquid fuel and air from a carburetor, means for receiving liquid fuel and air from said chamber and conducting the same to a plurality of cylinders of an internal combustion engine including passages leading from said chamber at opposite ends thereof, two walls of said chamber having portions thereof offset outwardly with the ends of said offset portions located at predetermined points with respect to said passages and constituting shoulders for deflecting liquid fuel from said walls inwardly toward the longitudinal median line of the chamber so that such deflected fuel will be picked up by and commingled with air as it leaves the chamber and enters the respective passages, the cross sectional area of said chamber at any of said shoulders being greater than the cross sectional area of any of the respective passages.

9. A manifold having a central chamber having means at the center of a wall thereof for receiving liquid fuel and air from a carburetor, means for receiving liquid fuel and air from said chamber and conducting the same to a plurality of cylinders of an internal combustion engine including two pairs of relatively short unrestricted passages, one pair leading from opposite ends of said chamber, the other pair projecting laterally from one wall of said chamber adjacent to its opposite ends, two walls of said chamber having portions thereof offset outwardly, the ends of the offset portions of both walls being located at a predetermined point with respect to the last mentioned laterally projecting passages and constituting shoulders for deflecting liquid fuel from said walls inwardly toward the longitudinal median line of the chamber so that such deflected fuel will be picked up and commingled with air as it leaves the chamber and enters the respective pairs of passages.

In testimony whereof we affix our signatures.

NED S. REED.
HARRY G. SANGER.